No. 692,873. Patented Feb. 11, 1902.
H. LEMP.
STEERING MECHANISM FOR VEHICLES.
(Application filed Aug. 18, 1900.)
(No Model.) 2 Sheets—Sheet 1.
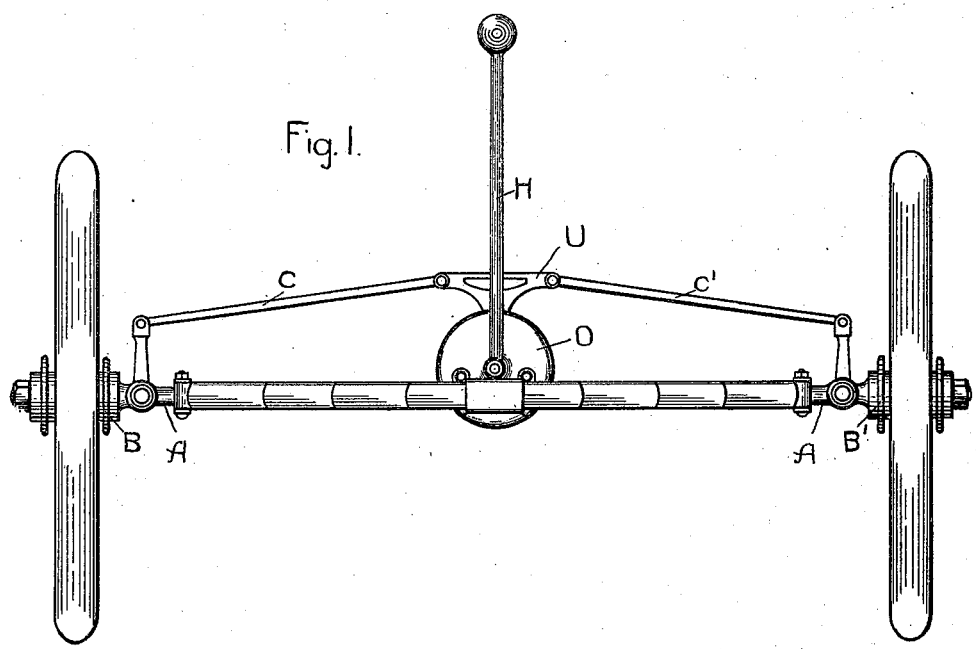
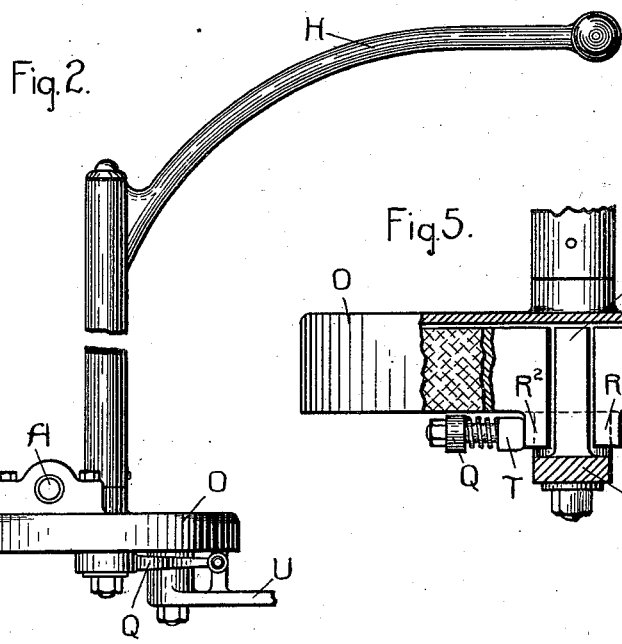
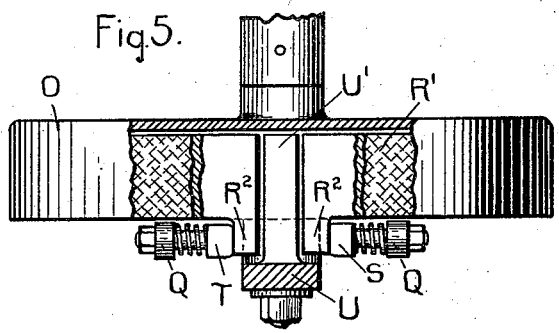
Witnesses:
Rob't C. Chapman
Alex F. Macdonald
Inventor:
Hermann Lemp.
by Albert G. Davis
Atty.
THE NORRIS PETERS CO., PHOTO-LITHO., WASHINGTON, D. C.

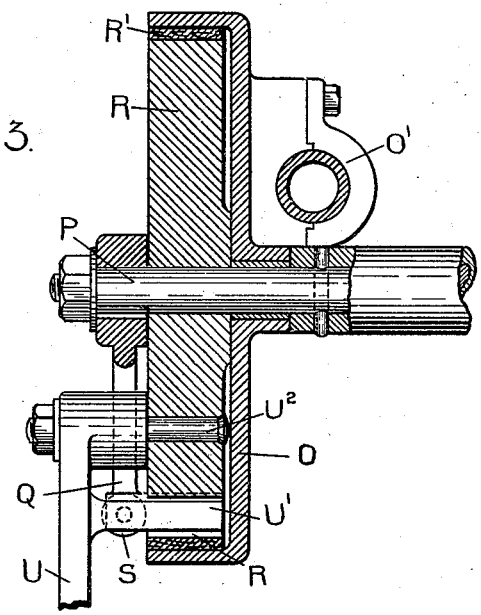
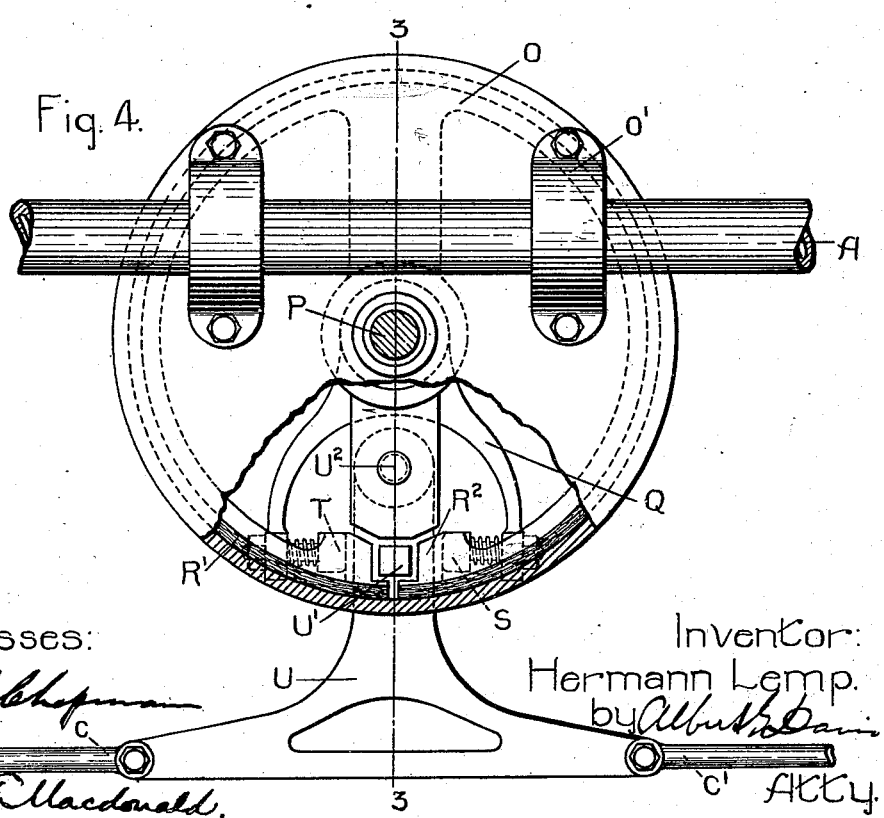

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

STEERING MECHANISM FOR VEHICLES.

SPECIFICATION forming part of Letters Patent No. 692,873, dated February 11, 1902.

Original application filed October 24, 1898, Serial No. 694,372. Divided and this application filed August 18, 1900. Serial No. 27,259. (No model.)

*To all whom it may concern:*

Be it known that I, HERMANN LEMP, a citizen of the United States, residing at Lynn, county of Essex, State of Massachusetts, have invented certain new and useful Improvements in Steering Mechanism for Vehicles, (Case No. 1,717,) of which the following is a specification.

The present application is a division of one of my pending applications, Serial No. 694,372, filed October 24, 1898, on steering mechanisms for vehicles and is filed under the provisions of Rules Nos. 41 and 42 of the Rules of Practice in the United States Patent Office.

The present invention has for its object to provide a simple steering mechanism for automobiles which is so arranged that the steering-handle is automatically locked in position whenever the pressure thereon is removed and also when the steering wheel or wheels tend to move at a rate of speed different from that of the handle, thereby preventing the transmission of wheel strains to the hand of the operator. In carrying out my invention the parts are so arranged that the locking and unlocking of the wheels takes place during the act of steering without thought on the part of the operator.

In the accompanying drawings, which illustrate my invention, Figure 1 is a plan view of a portion of a vehicle, showing the front axle and steering devices. Fig. 2 is a side elevation of the steering handle and check. Fig. 3 is a section on line 3 3 of Fig. 4. Fig. 4 is a top plan view of the steering-check with certain of the parts broken away, and Fig. 5 is a detail sectional view looking toward the actuator.

Referring to the drawings, A represents the stationary front axle or support, and pivoted in suitable supports at the ends thereof are short axles B and B'. The short axles are connected to the steering-handle H by means of rods C C', the lever U, and fork Q. Mounted on the under side of the fixed axle A and secured thereto by clamps O' is an inverted-cup-shaped casting or support O, which forms the stationary element of the steering-check. Extending downward through the top of the casting and rigidly secured to the steering-handle is a shaft P, and rigidly mounted on the lower end of the shaft is a fork Q. Mounted in the ends of the fork are spring-pressed buffers S and T, Fig. 5, which normally press against the two enlarged ends or bosses $R^2$, formed on the rim of the split clutch-ring R. Loosely mounted on the shaft is the split clutch-ring R, having a band of leather R' on its periphery, which is arranged to engage with the inner surface of the stationary cup-shaped casting O. The stock at the point of division of the ring of the clutch is somewhat thickened to form ends or bosses $R^2$, against which the spring-pressed buffers S and T abut. The clutch-ring is provided with a center piece or hub, and pivotally secured thereto by a stud $U^2$, which is located between the center and the periphery, is a lever U. This lever causes the separation of the ends of the ring and is connected at its outer ends to the rods C and C', which in turn are connected to the short vehicle-axles. Formed integral with or otherwise secured to the lever U at a point between the pivot and the downwardly-extending flange of the cup-shaped casting O is an actuator U', which serves when a wheel strikes an obstruction during the act of steering to expand the ring of the clutch R. Under normal operating conditions, however, the friction between the leather R' and the inner face of the casting or support O is sufficient to hold the rods C and C', and consequently the wheels, in any given position; but the separation of the ends of the ring by the actuator still further increases the friction between the parts. When an obstruction occurs to the passage of either of the wheels, the action in detail is as follows: The lever U, moving around the pivot $U^2$ as a center, presses against one end or the other of the split ring of the clutch and causes an increase of pressure between the ring and the casting O.

When it is desired to move the wheels, pressure is applied to the steering-handle, which is connected to the shaft O, and either the spring-pressed buffer S or T is compressed, depending upon which way the handle is moved. This causes the ends on each side of the split in the ring to approach sufficiently to release the casting O, and the wheels can be easily turned by the steering-handle. The relation between the steering-handle and the lock is such that a movement of the handle in either direction from a given position will first release the lock and then move the wheels, the lock automatically resuming its normal position as soon as the pressure is removed from the handle. With the steering mechanism constructed as described the lock or check will be set as soon as pressure is removed from the steering-handle irrespective of the position occupied by it, and it is impossible for the wheel strains to be transmitted to the hand of the operator, for as soon as the wheels tend to move at a speed different from that due to the steering-handle the piece U tends to turn on the stud $U^2$ as a center and cause the split clutch-ring to expand and grip the friction-face of the cup-shaped casting.

Having thus described my invention, what I claim as new, and desire to secure by Letters Patent of the United States, is—

1. In a steering mechanism for vehicles, the combination of a stationary support, a steering-shaft mounted within the support, a steering-wheel, a steering-handle, a means for locking the support to the shaft, which is capable of expanding and contracting, means actuated by the shaft for contracting or releasing said means, and means actuated by the steering-wheel for expanding or locking said means, whereby the transmission of wheel strains to the operating-handle is prevented.

2. In a steering mechanism for vehicles, the combination of a stationary element having a cylindrical surface, a friction-ring located within the stationary element and arranged to be forced outward into engagement with the cylindrical surface and lock the steering-wheel, means for moving the wheel, and means for automatically moving the friction-ring out of engagement with the cylindrical surface as the steering-handle is moved.

3. In a steering mechanism for vehicles, the combination of a steering-handle having a lost-motion connection with the steering-wheel, a friction-clutch between the handle and the wheel, a connection extending from the wheel to the clutch, comprising a stationary cylindrical casing and an expansible and contractible ring mounted therein, and means actuated by the handle as it moves either way from a central position for releasing the clutch.

4. In a steering mechanism for vehicles, the combination of a double-axle suspension for the steering-wheels, pivoted rods connecting the axles, a fixed element having a friction-surface, an expansible and compressible movable member mounted within the fixed element and arranged to engage with the friction-surface, a steering-handle having a lost-motion connection with the steering-wheels, and means actuated during the time the lost motion is being taken up for positively moving the friction member out of engagement with the stationary element.

5. In a steering mechanism, the combination of a fixed support having a curved friction-surface on its inner wall, a split movable member mounted within the support and arranged to make frictional engagement therewith, and means for forcing the member outward into engagement with the surface, comprising a lever pivoted to the movable member between the center of movement and the curved friction-surface, which is provided with an actuator that enters between the split in the said member.

6. In a steering mechanism, the combination of a double-axle suspension, a rod connecting the axles, a cup-shaped casting and a split-ring clutch arranged to form a friction-clutch, the casting being secured to one element of the vehicle and the clutch to another, the two elements being movable with respect to each other, a lever connected to the rod and one element of the clutch, a steering-handle having a lost-motion connection with the steering-wheels, and means operated by the steering-handle for releasing the clutch before the handle operates to steer the vehicle.

7. In a steering mechanism for vehicles, the combination of a cup-shaped casting, clamps for securing the casting to a fixed part of the vehicle, a clutch having a split ring mounted within the casting and forming the moving member of a friction-clutch, a steering-handle, a fork carried by the handle and provided with means for gripping the split ring of the clutch on opposite sides of the split, and a lever which is pivoted to the clutch and is connected to the steering-wheels.

8. In a steering mechanism for vehicles, the combination of cup-shaped casting forming one element of a clutch, a split ring forming the second element of the clutch, an actuator carried by the steering-handle and arranged to release the split ring from the cup-shaped casting, a lever pivotally secured to the split ring and connected to the steering-wheels, and means carried by the lever for forcing the split ring into engagement with the cup-shaped casting.

9. In a steering mechanism for vehicles, the combination of an inverted-cup-shaped casting, clamps for securing the casting to a fixed part of the vehicle, a steering-shaft having a lost-motion connection with the wheels, a split ring loosely mounted on the shaft, a forked actuator rigidly secured to the shaft, spring-buffers between the arms of the fork and the bosses formed on the ring each side of the split, a lever pivotally secured to the hub of the ring and connected to the wheels, and an actuator carried by the lever which extends between the split in the ring and forces it into engagement with the cup-shaped casting.

10. In a steering mechanism, the combination of a cylindrical support, a shaft extending through the support, a split ring sleeved on the shaft, a forked arm rigidly secured to the shaft and arranged to force the ends of the ring toward each other when moved by the shaft, a lever pivoted to the split ring and connected to the steering-wheel, and an actuator carried by the lever for expanding the ring.

11. In a steering-check for vehicles, the combination of a steering-wheel, a support, a shaft which extends through the support and is secured to the steering-wheel, an elastic friction device comprising a metal piece which is arranged to engage with a friction-surface on the support and act as a lock, means for forcing the piece into engagement with said surface and thereby prevent the transmission of wheel strains to the operating device, and means for releasing the piece when it is desired to change the position of the steering-wheel.

12. In a steering mechanism for vehicles, a pair of wheels mounted on independently-pivoted axles, a lock preventing turning of the wheels by power transmitted by said wheels, the said lock comprising a member capable of expansion and contraction and a non-expansible member, a steering-handle connected to the wheel-axles, and intermediate mechanical connections for releasing the lock and turning the vehicle to right or left by a simple handle movement in that direction.

In witness whereof I have hereunto set my hand this 15th day of August, 1900.

HERMANN LEMP.

Witnesses:
ALEX F. MACDONALD,
BENJAMIN B. HULL.